US007198813B2

(12) United States Patent
Wixforth

(10) Patent No.: US 7,198,813 B2
(45) Date of Patent: Apr. 3, 2007

(54) METHOD AND DEVICE FOR MANIPULATING SMALL AMOUNTS OF LIQUID ON SURFACES

(75) Inventor: Achim Wixforth, Munich (DE)

(73) Assignee: Advalytix AG, Brunnthal (DE)

( * ) Notice: Subject to any disclaimer, the term of this patent is extended or adjusted under 35 U.S.C. 154(b) by 0 days.

(21) Appl. No.: 10/475,957

(22) PCT Filed: Apr. 24, 2002

(86) PCT No.: PCT/EP02/04545

§ 371 (c)(1),
(2), (4) Date: Oct. 24, 2003

(87) PCT Pub. No.: WO02/085520

PCT Pub. Date: Oct. 31, 2002

(65) Prior Publication Data

US 2004/0180130 A1 Sep. 16, 2004

(30) Foreign Application Priority Data

Apr. 24, 2001 (DE) ................................ 101 20 035

(51) Int. Cl.
*B05D 1/32* (2006.01)
*B05D 5/04* (2006.01)
*B32B 3/04* (2006.01)

(52) U.S. Cl. ...................... 427/2.1; 427/2.11; 427/256; 427/444; 428/156; 428/411.1

(58) Field of Classification Search ................. 427/2.1, 427/2.11, 256, 444; 428/156, 411.1

See application file for complete search history.

(56) References Cited

U.S. PATENT DOCUMENTS

| | | | |
|---|---|---|---|
| 4,233,029 | A | 11/1980 | Columbus |
| 5,707,799 | A | 1/1998 | Hansmann et al. |
| 5,770,860 | A | 6/1998 | Franzen |
| 5,885,527 | A | 3/1999 | Buechler |
| 6,287,872 | B1 | 9/2001 | Schurenberg et al. |
| 2002/0031835 | A1 | 3/2002 | Schwartz |

FOREIGN PATENT DOCUMENTS

| | | |
|---|---|---|
| DE | 196 28 178 | 9/1997 |
| DE | 19748295 | 5/1999 |
| DE | 197 54 978 | 7/1999 |

(Continued)

OTHER PUBLICATIONS

U.S. Appl. No. 60/203,597.*
Muller, O., "Lab-On-a-Chip-Technologie-Revolution im (Bio-)Analytischen Labor," Laborwelt, No. 1, 2000, pp. 36-38.

(Continued)

*Primary Examiner*—Jennifer Michener
(74) *Attorney, Agent, or Firm*—Dilworth & Barrese LLP

(57) ABSTRACT

The invention relates to methods and devices for manipulation of small amounts of liquid on surfaces, preferably on chip surfaces. According to the present invention, a quantity of liquid held together by its surface tension is applied on an area of a surface with at least one intermediate region, which borders at least in one lateral direction on a guide strip. According to the present invention, the guide strips have different surface characteristics relative to the intermediate region, such that they are more strongly wetted by a liquid, or the intermediate region is raised relative to the guide strips, whereby the height of the step is small relative to the height of the quantity of liquid.

35 Claims, 4 Drawing Sheets

FOREIGN PATENT DOCUMENTS

| | | |
|---|---|---|
| DE | 198 27 754 | 2/2000 |
| DE | 198 19 537 | 3/2000 |
| DE | 199 23 761 | 2/2001 |
| DE | 10117771 | 10/2002 |
| EP | 0392678 | 10/1990 |
| EP | 0905515 | 3/1999 |
| FR | 2783179 | 3/2000 |
| GB | 2374818 | 10/2002 |
| WO | 99/54730 | 10/1999 |
| WO | 00/16082 | 3/2000 |
| WO | 02/30562 | 4/2002 |
| WO | 02/076878 | 10/2002 |

OTHER PUBLICATIONS

Kohler et al. , "Mikrosysteme für die Biotechnologie," Physicalische Blatter 56, No. 11, 2000, pp. 57-61.

Adamson et al., "Physical Chemistry of Surfaces," John Wiley & Son, Inc., New York 1997, Sixth Edition, pp. 372-375 and 466-467.

Fu et al., "A microfabricated fluorescence-activated cell sorter," Nature Biotechnology vol. 17, Nov. 1999, pp. 1109-1111.

Sano et al., "A new manipulator based on surface acoustic wave streaming," Ultrasonics Symposium, 1997, Proceedings, 1997 IEEE Toronto, Ont., Canada, Oct. 5-8, 1997, New York, NY USA, IEEE, US, Oct. 5, 1997, pp. 467-470.

Gau, et al., "Liquid Morphologies on Structured Surfaces: From Microchannels to Microchips," Science, vol. 283, No. 1, Jan. 1999, pp. 46-49.

Luginbuhl et al., "Ultrasonic Flexural Lamb-Wave Actuators based on PZT Thin Film," Sensors and Actuators A, Elsevier Sequoia S.A., Lausanne, SW, vol. 64, No. 1, 1998, pp. 41-49.

* cited by examiner

METHOD AND DEVICE FOR MANIPULATING SMALL AMOUNTS OF LIQUID ON SURFACES

BACKGROUND OF THE INVENTION

The invention relates to methods and devices for manipulation of small amounts of liquids on surfaces, preferably chip surfaces.

The term liquid, in the present text, includes among others liquids, mixtures, dispersions, and suspensions, as well as liquids, in which solid parts, for example, biological material, are located.

With the "lab-on-a-chip" technology existing at the earliest time, it is desirable to move a defined, small quantity of liquid to a defined analysis or synthesis point. The quantities of liquid are therefore, for example, in the range of picoliters or milliliters. The analysis points often have only dimensions of a few micrometers or less on chips in the size of electronic semi-conductor elements.

The analysis of this type of quantities of liquid already is used today for analysis in biology (Ann Y. Fu et al., Nature Biotechnology 17, page 1109 and on (1999)). These methods are used, among other things, for inorganic reagents or organic material, such as cells, molecules, macromolecules or genetic materials, or in buffer solutions.

Thus, the movement and the reaction of defined volumes of small quantities of liquids are realized by means of micro-structured channels (for example, O. Müller, Laborwelt 1/2000, pages 36–38). Such channels, for example, are etched into the chip and are many micrometers deep or wide and generally capped. The movement takes place by means of electrokinetic (M. Köhler et al, Physicalische Blätter 56, Nr. 11, pages 57–61), mechanical or electrical pumps or capillary forces, respectively, in micro-structured channels.

High pump power is necessary, in order to move a liquid through these channels. Based on the sharp edges and narrow channels, cleaning after use is very difficult.

Should a liquid or material contained therein be analyzed on a specific surface, then often a chemically, physically, and/or biologically functionalized surface is used. In order to perform such analysis or synthesis at a good localized point, the functionalized area must be located within a channel and is thus difficult to make. With a corresponding functionalizing on a free surface without channel forming, on the other hand, an accurate localization of the liquid during the analysis is not warranted.

SUMMARY OF THE INVENTION

An object of the present invention is to provide a method and a device, with whose assistance, a manipulation of small quantities of liquids along accurately defined transport paths or at defined analysis or synthesis points is possible, whereby the method or the device can be made cost effectively or performed simply.

This object is solved with a method and device with the features described herein.

With the method of the present invention, a small amount of liquid, which is held together by its surface tension, on an area of a surface, for example, is applied to a solid body surface, which includes an intermediate region and at least one guide strip. The intermediate region is defined by guide strips at least in one spatial direction. The surface characteristics of at least one intermediate region and the guide strips are selected, such that a surface with a surface characteristic, which corresponds with the surface characteristic of a guide strip, are wetted more strongly with the quantity of liquid than a surface with the surface characteristics of the intermediate region. Between the liquid and a guide strip, then, a flatter wetting angle of contact is positioned, then between the liquid and the intermediate region. The liquid is applied on the surface, such that it contacts a guide strip as well as the intermediate region. The necessary quantity, for example, can be determined in pre-sampling or can be reached by successive application of the liquid.

With a device of the present invention, at least one correspondingly arranged guide strip for defining an intermediate region with the corresponding surface characteristics is provided.

The quantity of liquid is held by surface tension and by the preferred wetting with the surface at least of one guide strip. In order to further promote the localization, the surface of the surface outer region, which is adjacent to a guide strip on its side facing the bordering intermediate region, has different wetting characteristics from the surface of an intermediate region, such that the surface of the intermediate region wets more strongly with the small quantity of liquid. The surface of at least one guide strip wetted by the liquid, then, is the strongest. Since the surface of the surface outer region is wetted even less with the quantity of liquid than the intermediate region, the quantity of liquid is localized additionally in the area of the intermediate region and the guide strips.

The different surface characteristics can be achieved by corresponding coatings. Thus, for example, for manipulation of an aqueous solution, the surface of the guide strips can be selected to be hydrophilic in comparison to the surface of the intermediate region. With oily solutions to be analyzed, the guide strips can be selected to be lipophilic in comparison to the intermediate region.

The coatings can be achieved in a simple manner, for example, by lithographic methods with subsequent coating steps. Different wetting characteristics can be achieved further by means of micro-structuring, as is the case with the so-called lotus effect, which contacts the different roughnesses of the surfaces. This can be maintained, for example, by micro-structuring of the corresponding surface regions, for example, by chemical treatment or ionic radiation.

With another form of the invention, the intermediate region is raised relative to at least one guide strip, whereby the raised step is smaller than the height of the quantity of liquid on the intermediate region held together by surface tension. Such a stepping between the guide strips and intermediate region can be achieved through a very flat etching, for example, with a depth in the submicrometer range of the surface of a solid body chip. Alternatively, with the aid of lithographic methods, the intermediate region can comprise a coating, or it can be grown in all regions of the surface with absorption of the guide strip crystal material.

Macroscopically, that is, on a longitudinal scale in dimension of the width of the intermediate region or the lateral extension of the small quantity of liquid, the surface remains essentially planar. Such a flat etching or step can be made very simply and definitely in finishing technology, without occurrence of the known problems of deep etchings of narrow channels.

Collectively, the inventive design is that on the edge of the intermediate region, guide strips are located, to which the liquid would like to disperse. With one form, this is affected by means of the preferred wetting of the guide strips; with another form, this is affected by the downward guiding step. On the sides of the intermediate region, then, the quantity of liquid is guided or retained by guide strips. The surface tension of the small quantity of liquid additionally prevents divergence.

The quantity of liquid, depending on the surface tension, can be found in the form of a drop on the intermediate region defined by the guide strips. With longitudinally extending intermediate regions with bordering guide strips, the liquid also can be found in the form of a "hose" on the intermediate region with the bordering guide strips.

The design of the present invention makes possible that in the intermediate region, independently from the wetting characteristics, a functionalizing can be selected. The localizing or guiding of the quantity of liquid is permitted by the guide strips. Thus, it is possible, for example, that material is analyzed in an aqueous solution at a functionalized region, which is hydrophobic. The functionalized hydrophobic region represents the intermediate region, which is surrounded by hydrophilic or recessed guide strips. The liquid, then, is held in the functionalized region, without the need for deep etching for accommodating the quantity of liquid, although the functionalized region is hydrophobic. The guide strips prevent the liquid from leaving the functionalized and hydrophobic region. Of course, also a combination of the embodiments with modular wetting characteristics and recessed guide strips is possible.

With a further embodiment of the methods of the present invention or the devices of the present invention, the width of the guide strips are greater than the width of a precursor film of the liquid to be analyzed, preferably more than approximately 100 nm. The precursor film forms by condensation of liquid vapor on a solid body (A. W. Adamson and A. P. Gast, "Physical Chemistry of Surfaces," John Wiley & Son, Inc., New York 1997, $6^{th}$ edition, pages 372, 373) in the environment of a quantity of liquid on a surface independently from the wetting angle of contact.

With one advantageous form, the small quantity of liquid is defined on multiple sides by guide strips. Thus, an accurate localization of the quantity of liquid can be achieved, in order, for example, to enable performance of a reaction at a localized point. The liquid can be guided to such a reaction region, for example, on an intermediate region limited on two sides by guide strips in a type of guide rails.

For transport of small quantities of liquid on a chip surface, parallel arranged guide strips with an intermediate region located therebetween are suited.

By action of an outer force, for example, a liquid drop is guided along such an intermediate region with laterally arranged guide strips, such as on a "track".

In the intermediate region, various functionalized surface regions can be arranged, whereby no particular consideration must be given to their wetting characteristics.

With one form with an intermediate region, which is wetted worse by the liquid than the guide strips, only minimal a braking force on the liquid is produced, so that a faster transport is possible.

With a further embodiment, multiple guide strips are arranged parallel to one another, whereby, respectively, between two guide strips, an intermediate region is located. The outer guide strips serve for lateral limiting of the movement of the liquid, while the guide strips located therebetween permit the stabilizing of the movement.

The methods of the present invention or the devices of the present invention are suited for chemical, physical, and/or biological analysis of the quantity of liquid or of material in the quantity of liquid. In this connection, the intermediate region can be functionalized accordingly. Particularly advantageous, the method or device can be used to analyze biological material, for example, cells or DNA molecules in buffer solutions. Thus, the intermediate region is functionalized with the aid of biological macromolecules. The liquid is brought into the functionalized region and localized by the guide strips or limited in their movement in one spatial direction. The biological material located in the liquid reacts with the biological macromolecules in the intermediate region. The changes resulting from the physical, chemical and/or biological behavior can be analyzed and used for analysis.

Of course, a plurality of these types of "reaction regions" can be provided on a chip, which makes possible a "DNA screening", for example.

With advantageous further embodiments of the methods or devices of the present invention, an outer force effect is used, in order to achieve a stirring of the small quantity of liquid. In this manner, a reaction can be accelerated or uniform reaction conditions can be achieved.

If guide strips in a parallel orientation are provided, between which an intermediate region is disposed, then the quantity of liquid can be moved along these guide strips by effect of an outer force.

If the quantity of liquid moves along a longitudinally extending intermediate region with defining guide strips, whose distance is not constant, then the shape of the small quantity of liquid changes corresponding to the lateral extension of the intermediate region with the defining guide strips.

The outer force can be produced in various ways, for example, electrostatically. Especially advantageous, however, is the production of an outer force with the aid of surface sound waves. These types of surface sound waves lead to a mechanical deformation of the surface, which affects an impulse transmission on the quantity of liquid.

If, for example, a piezoelectric crystal is used as the solid body, on which the arrangement is located, then the mechanical deformation of the surface is accompanied additionally by electrical fields, which, in turn, affect a force effect on charged or polarizable material within the liquid to be analyzed.

By the named effects, a surface sound wave transmits an impulse to the liquid. The impulse affects a movement of the liquid in the direction of the dispersion direction of the surface sound waves. In addition, stirring of the liquid by the action of the surface sound waves is achieved.

Of course, also multiple quantities of liquid can be guided to one another with surface sound waves from different directions, in order to react with one another or to mix.

For production of surface sound waves, advantageously, an inter-digital transducer made is inserted on a piezoelectric region of the substrate or on a piezoelectric substrate. Thus, it is sufficient when the substrate or the corresponding coating is piezoelectric only in the area, in which the inter-digital transducer is located.

Such an inter-digital transducer has two electrodes in simple designs, which engage in one another in the manner of fingers. By application of a high frequency alternating field, for example in the magnitude of 10 to 100 MHz, a surface sound wave is stimulated in the piezoelectric substrate or in the piezoelectric region of the substrate, when the resonance condition is approximately fulfilled, that the finger distance of an electric corresponds to the quotients of the surface sound speed and the frequency. The surface sound wave has the wave length of the finger distance of an electrode and its dispersion direction is essentially perpendicular to the engaged finger electrode structures. Such an inter-digital transducer can be made very simply and cost-effectively with known lithographic methods and coating technologies. Inter-digital transducers can be controlled wirelessly, for example, by radiating an electromagnetic alternating field in an antenna device connected with the inter-digital transducer.

In order to drive a quantity of liquid along a longitudinally extending intermediate region with transverse, enclosing guide strips, for example, an inter-digital transducer is arranged on the chip surface, such that one of its wave dispersion directions essentially is along the longitudinal extending arrangement from the intermediate region and guide strips.

Of course, multiple inter-digital transducers can serve for controlling different paths formed by intermediate regions with enclosing guide strips. Likewise, a network arrangement of corresponding paths and associated inter-digital transducers is possible.

With use of inter-digital transducers with non-constant finger distance ("tapered inter-digital transducer"), also the lateral dispersion region of the surface sound of an inter-digital transducer can be limited. With such tapered inter-digital transducers, different regions of a chip can be selectively controlled.

Inter-digital transducers can be realized in different geometries. According to the present invention, also other inter-digital transducer geometries can be used, such as those known from the technology of surface wave filters.

Particular advantages of the impulse transmission by means of surface sound waves for movement or stirring of small quantities of liquid are:

- Different temporal courses of the force, such as, for example, pulses of various lengths, can be electronically defined.
- The strength of the force effect on the small quantity of liquid can be adjusted in a wide region over the amplitude or the pulse frequency of the surface sound waves.
- The acoustic irradiation of the solid body surface with the surface sound waves can affect an automatic cleaning of the area passed over.
- A control via corresponding software is possible in a simple manner.

The method or device of the present invention can be used advantageously also in a system of various analysis or synthesis points on a solid body chip. In this manner, a so-called "lab-on-a-chip" is formed. In this manner, longitudinally extending intermediate regions with two-sided, lateral guide strips serves as connection points between different analysis or synthesis points. Individual intermediate regions, which are surrounded on multiple sides by guide strips, can be used as reaction regions. Of course, the device or method of the present invention can be combined with other transport or localization methods on one chip.

The liquid, for example, is applied with the aid of a pipette robotic onto the intermediate region, such that at least one guide strip is contacted. The necessary quantity can be determined in pre-trials or can be achieved by successive application of the liquid. With contact of two guide strips, which, for example, are arranged in parallel, the quantity of liquid is localized by the preferred wetting of the guide strips in cooperation with the surface tension. With a suitable selection of geometry or of method cycle, the liquid can also be self-adjusting. The liquid quantity is brought into contact with a guide strip and the intermediate region. By outer force effect, for example, by a surface sound wave or by movement of the entire chip, the quantity of liquid is moved, such that it can come into contact with a further guide strip. It adjusts itself, then, in a self-adjusting manner, in which the quantity of liquid, based on its surface tension and the preferred wetting of the guide strips, is retained between these.

BRIEF DESCRIPTION OF THE DRAWINGS

Next, the invention will be explained in detail with reference to the accompanying figures. The schematic figures serve for clarification of the principles and are not necessarily to scale. The figures show sections of plan view or cross sections of chip surfaces, which can be a part of a greater complex. In the figures.

DESCRIPTION OF THE PREFERRED EMBODIMENTS

Figure 1:
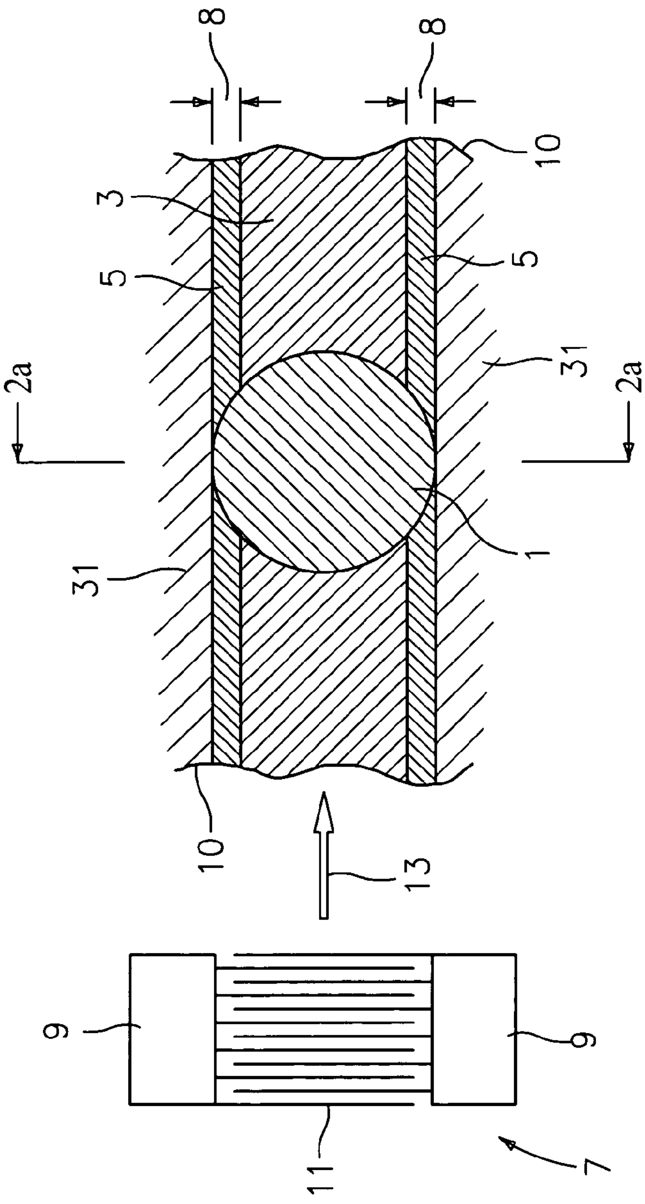
FIG. 1 shows a plan view of a device according to the present invention during the performance of the method of the present invention.

FIG. 1 shows in schematic representation and in plan view the performance of a method of the present invention with the device of the present invention. Shown is a cut-out section from a chip surface. The shown embodiment serves for transport of a small quantity of liquid 1 along a defined distance. In this manner, reference numeral 5 designates lateral guide strips of the width 8. Reference numeral 1 designates a liquid drop, which is localized by its own surface tension on the solid body surface.

Typically, the guide strips are approximately one-tenth to one third of the lateral extension of the quantity of liquid to be manipulated, in the shown example, then, of the drop diameter, however larger than the width of the precursor film, that is, greater than approximately 100 nm.

The liquid volume moves in dimensions from 1 $\mu m^3$ to 1 $cm^3$.

Between the guide strips 5, an intermediate region 3 is located, which, for example, is reaction functionalized. For example, biological macromolecules can be bound in the reaction functionalized intermediate region 3. Also, the strip formed from the intermediate region 3 with the guide strips 5 is not completely shown in FIG. 1, which should be explained by the lateral broken line 10. Different geometries and sizes are contemplated.

Spaced from the strip arrangement of intermediate region 3 and guide strip 5, an inter-digital transducer 7 is located, which is applied on the solid body surface with known lithographic technologies and coating technologies. The inter-digital transducer comprises electrodes 9 with finger-type appendages 11, which engage in one another. The distance of the individual fingers is in the dimension of micrometers. With the embodiment of FIG. 1, the arrangement is located on a piezoelectric crystal, for example, a lithium niobate. Alternatively, the surface of the chip can be provided with a piezoelectric layer, for example, made from zinc oxide. Upon application of an electromagnetic alternating field on the electrodes 9 in dimensions of 10 to 100 MHz, in the known manner, a surface sound wave with a dispersion direction perpendicular to the extension direction of the finger-type electrodes 11 is stimulated. The part of interest of the surface sound wave produced in this manner has a wave path in the direction 13.

The distance of the inter-digital transducer 7 from the shown strip arrangement is not shown to scale. Greater distances are contemplated, as are known from surface sound wave technology.

Figure 2A:
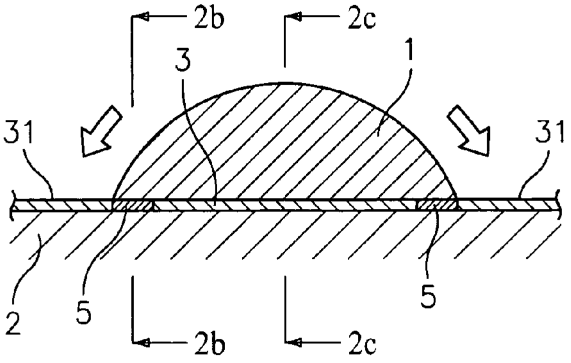
FIG. 2*a* shows a cross section through the arrangement of FIG. 1 along the line A—A in the shown line of sight.

FIG. 2*a* shows a section through the arrangement of FIG. 1 along the line A—A in the line of slight shown in FIG. 1. The piezoelectric solid body is designated with reference numeral 2. With the shown embodiment, a hydrophobic reaction functionalizing 3 is located between the guide strips 5. The liquid drop 1, for example, an aqueous solution with biological material, disperses until to the outer limits of the hydrophilic guide strips 5. Outside of the guide strips 5, the surface 31 is likewise hydrophobic. The surface wetting characteristics therefore are selected, such that a smaller wetting is present than with the reaction functionalized surface in the intermediate region 3. Thus, an additional localization of the quantity of liquid on the intermediate region 3 and the guide strips 5 is achieved.

Figure 2B:
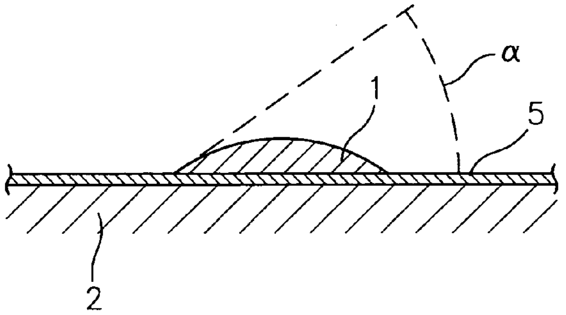
FIG. 2*b* shows a cross section according to the line along line B—B of FIG. 2*a*, in the shown direction.
Figure 2C:
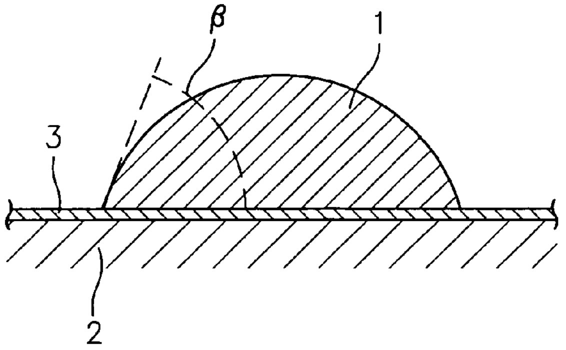
FIG. 2*c* shows a cross section along the line C—C with the line of sight provided in FIG. 2*a;*

FIG. 2*b* shows a section along line B—B of FIG. 2*a*. In this region, the liquid of the liquid drop 1 is located over the entire cross section on the hydrophilic region 5. The wetting angle of contact α is positioned according to the selection of materials. FIG. 2*c* shows a section along line C—C of FIG. 2*a*. Here, the edge of the liquid on the hydrophobic part 3 is found. Accordingly, the wetting angle of contact β is very much steeper than the wetting angle of contact α of the liquid on the hydrophilic region of FIG. 2*b*.

Such an arrangement can be used as follows. A liquid drop 1 is applied on the strip arrangement on the intermediate region 3 with the lateral guide strips 5. The liquid drop 1 includes an aqueous solution with, for example, biological material. The necessary amount of liquid can be determined in pre-trials. Likewise, the amount can be increased successively, for example, with the aid of a pipette, until both guide strips 5 at least are contacted. Based on the hydrophilic qualities of the lateral guide strips 5, the liquid drop disperses in the direction of the edge. Based on the surface tension of the drop, it is held together in its shape and a diverging is prevented. This is greatly reinforced by the surface characteristic of the surface region 31, in which a still smaller wetting occurs than in the intermediate region 3. In the intermediate region 3, which has more strongly hydrophobic characteristics than the guide strips 5, a steeper wetting angle of contact β is formed, while in the region of the guide strips 5, a flatter wetting angle of contact α is formed.

An electrical alternating field of the provided dimension is applied on the electrodes 9 of the inter-digital transducer, in order to emit a surface sound wave in the direction 13. The surface sound wave transmits its impulse to the liquid drop 1, for example, by the mechanical deformation of the surface. The liquid drop is moved forward in this manner in the direction 13. The guide strips 5 prevent a lateral bursting or breaking out. This behavior is independent of which wetting characteristics the intermediate region 3 has. Also, a less hydrophilic region, such as that provided with the shown embodiment, is possible for the intermediate region 3, since the direction of the drop movement is determined by the guide strips 5. A defined movement of the liquid drop along such a "track" is produced.

Such an arrangement can be used in order to bring the liquid drop, for example, to a selected analysis point, in which the intermediate region 3 is functionalized in a particular form, in order to make possible a reaction or analysis, for example. In this manner, no consideration must be made of the wetting characteristics of the intermediate region, since the movement of the drop is determined by the guide strips 5.

With the shown embodiment, the liquid is arranged in the form of a drop 1 on the surface. With a correspondingly narrower embodiment, the liquid is in the form of a "liquid tube" on the "track" 3, 5.

Figure 3:
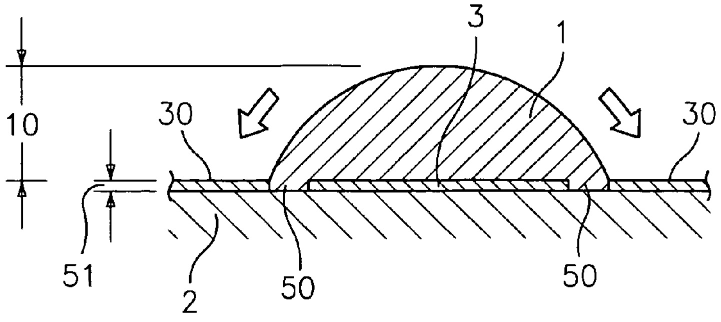
FIG. 3 shows an alternative embodiment in cross section.

In FIG. 3, an alternative embodiment is shown. The view corresponds with the representation in FIG. 2*a* of the first embodiment. The same elements are designated with the same reference numerals. With the embodiment shown in FIG. 3, the guide strips are achieved by flat depressions 50 in the surface. With the shown embodiment, a coating is found between the guide strips, if necessary, with the desired reaction functionalizing. The thickness of the coating is thinner than approximately a tenth of the surface sound wave length, which can be produced with a transducer 11. Outside of the guide strips 50, a coating 30 with similar wetting characteristics as the reaction functionalizing coating 3 is found. The depth 51 of the recessed region 50 is very much smaller than the height 10 of the liquid drop 1, for example, in the sub-micrometer range. A liquid drop 1, which is applied on the intermediate region 3, flows laterally in the guide strips 50. Its surface tension prevents it from again leaving the recessed region 50 again on the removed side. Also, the necessary quantity depends on the materials used, for example, as determined in trials. In this manner, likewise a "track" effect can be achieved, as with the embodiment of FIGS. 1 and 2.

The drive of the liquid drop 1 takes place likewise with an inter-digital transducer in an analogous arrangement as that of FIG. 1.

Figure 4:
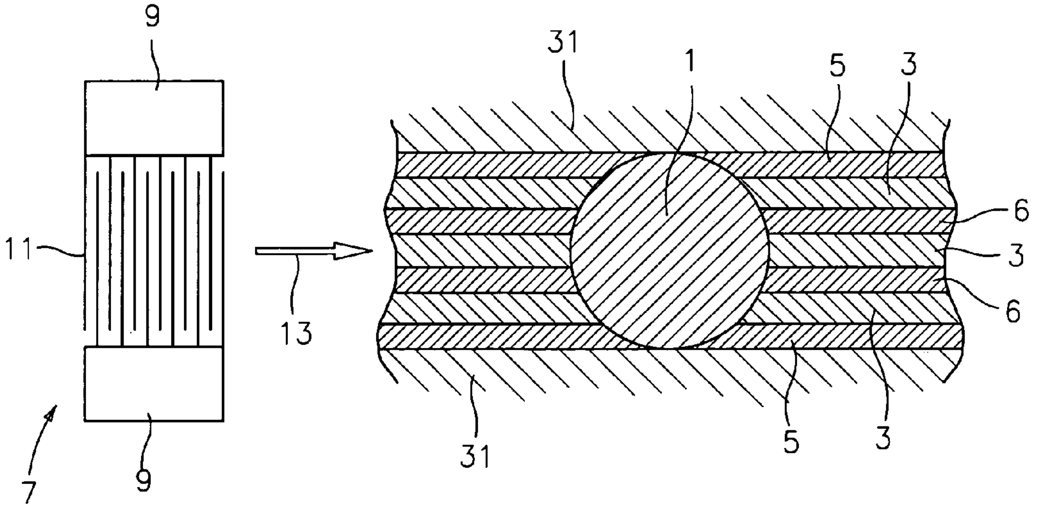
FIG. 4 shows a plan view of a further embodiment of the device of the present invention with the performance of the method of the present invention.

In FIG. 4, an embodiment with multiple guide strips 5, 6 is shown. The same elements are provided again with the same reference numerals. While the outer guide strips 5 prevent the lateral breaking-out of the quantity of liquid 1, the guide strips 6 serve for further stabilization of the movement in direction 13. The surface characteristics of the guide strips 6 correspond to the surface characteristics of the guide strips 5. Analogous to the embodiment of FIGS. 1 and 2, the surface regions 5 and 6 are formed to be hydrophilic, when the liquid drop to be moved is an aqueous solution. The wetting characteristics of the intermediate region 3 can be freely selected, so that a reaction functionalizing can be provided, which is independent from the wetting characteristics.

Figure 5:
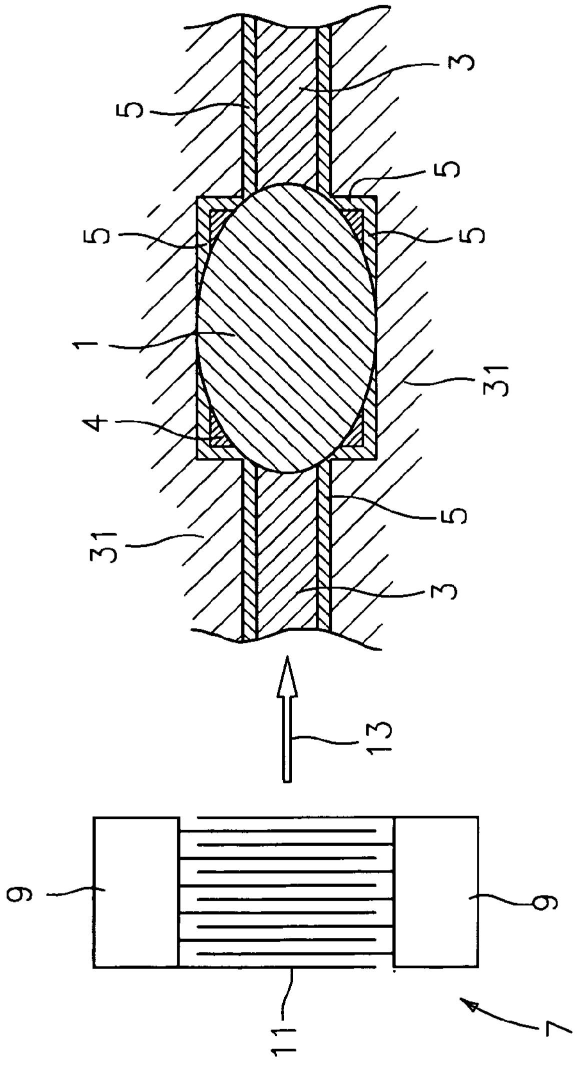
FIG. 5 shows a further embodiment of the device of the present invention with the performance of the method of the present invention.

FIG. 5 shows an arrangement, such as one that can be used for analysis, for example. The guide strips 5 form a border. Within this border 5, a reaction functionalized region 4 is located. For example, biological macromolecules can be bound on the surface. The wetting characteristics of the surface region 4 can be selected independently from the type of liquid 1, since a lateral breaking-out is prevented by hydrophilic strips 5 in cooperation with the surface tension of the quantity of liquid 1.

With the arrangement of FIG. 5, an analysis can be performed as follows. Via the intermediate regions 3 with the lateral guide strips 5, an amount of liquid can be applied in the direction of the reaction region 4 with the aid of a surface sound wave, which is produced with the inter-digital transducer 7, as described, for example, with reference to FIG. 1. The liquid 1 can be held in the reaction region 4. Through the correspondingly selected, for example, biological functionalizing, a reaction occurs between the biological functionalizing of the surface 4 with the biological material, which is contained in the liquid 1, for example. After the reaction, the liquid can be removed again by further radiating of a surface sound wave on the other side of the reaction region 4. Of course, also other, for example, physical analyses, can be performed.

Of course, also the arrangement of FIG. 5 with the aid of flat, recessed regions can be realized instead of the guide strips 5, such as, for example, those described with reference to FIG. 3. Finally, multiple liquids can be applied together on the reaction region 4 for reaction.

Various reaction regions 4 of this type can be bound to one another via corresponding "tracks" and so various reactions are possible with one liquid. Also, other analysis or synthesis stations can be provided, which are connected to one another via associations according to FIG. 1 to 4. Thus, a "lab-on-the-chip" is realized, in which a very small quantity of liquid is utilized for different analyses.

The invention, then, makes possible a defined movement of a quantity of liquid on a chip surface. In this connection, no deeply etched channels with the existing, known difficulties are necessary. The surface remains essentially planar, can be cleaned very easily, and represents no additional hindrance for the movement of the quantity of liquid.

By the effect of the surface sound waves, the quantity of liquid is placed into turbulence and stirred. A reaction can be accelerated in this manner.

The shown geometries serve for clarification of the methods and devices of the present invention and therefore represent preferred embodiments. The claims include other arrangements of intermediate regions and guide strips or inter-digital transducers that are obvious to the practitioner. Likewise, the number of the shown elements is not limited. Thus, for example, multiple inter-digital transducers can be provided for the movement in various directions, when intermediate regions and guide strips have corresponding geometries.

What is claimed is:

1. A method for manipulation of small quantities of liquid on surfaces, in particular, chip surfaces, in which at least one small quantity of liquid (1) held together by its surface tension is applied onto an area of the surface with at least one intermediate region (3,4), which borders on and is disposed between at least two guide strips (5,6, 50) in a lateral spatial direction, whereby the small quantity of liquid (1) contacts said at least one intermediate region (3,4) and guide strips (5,6, 50), and the at least one intermediate region (3,4) and guide strips (5,6, 50) have different surface characteristics, which are selected with the guide strips (5, 6, 50) being more wettable than the intermediate region (3, 4), such that a surface with the surface characteristic of a guide strip (5, 6, 50) is wetted more strongly by the small amount of liquid (1) than a surface with the surface characteristic of the at least one intermediate region(3,4), and when the quantity of liquid (1) is placed upon the intermediate region (3,4) between the guide strips (5,6, 50), the liquid quantity (1) disperses in the direction of the guide strips (5, 6, 50) and is held upon the intermediate region (3, 4) by surface tension of liquid within the guantity (1) in which the small quantity of liquid (1) on the at least one intermediate layer (3, 4) is moved along the guide strips (5, 6, 50).

2. The method according to claim 1, in which the at least one intermediate region (3, 4) is selected to be raised relative to the guide strips (5, 6, 50), with a step between the at least one intermediate region (3, 4) and adjacent guide strip (5, 6, 50) being smaller than the height of the quantity of liquid (1) on the intermediate region (3, 4).

3. The method according to claim 1, in which surface characteristic of a surface outer region (31), adjacent a respective guide strip (5) on a side of the guide strip (5) facing away from the bordering intermediate region (3,4), is selected such that the small amount of liquid (1) wets worse than or at the same strength as the surface of the intermediate region (3, 4).

4. The method according to claim 1, in which the small quantity of liquid (1) is water or an aqueous solution and the at least one guide strip (5, 6, 50), compared to the at least one intermediate region (3,4), is selected to be hydrophilic.

5. The method according to claim 1, in which a lateral width (8) of a guide strip (5, 6, 50) is greater than a width of a precursor film of the quantity of liquid (1).

6. The method according to claim 5, in which the lateral width (8) of a guide strip (5, 6, 50) is greater than 100 nm.

7. The method according to claim 1, in which the small quantity of liquid (1) is surrounded in multiple spatial directions by guide strips (5, 6, 50).

8. The method according to claim 1, in which the quantity of liquid (1) is applied on an intermediate region (3,4), which is defined on two, essentially opposite sides by guide strips (5, 6, 50).

9. The method according to claim 1, in which the at least two guide strips (5, 6, 50) are arranged to be essentially parallel.

10. The method according to claim 1, in which the quantity of liquid (1) contacts multiple intermediate regions (3) and more than two guide strips (5,6).

11. The method according to claim 1, in which the at least one intermediate region (3,4) is at least partially physically, chemically, and/or biologically functionalized for reaction with the small quantity of liquid (1) and/or material contained therein.

12. The method according to claim 11, in which the at least one intermediate region (3,4) is functionalized by biological macromolecules.

13. The method according to claim 1, in which the small quantity of liquid (1) on the at least one intermediate region (3,4) is moved along the guide strips (5,6, 50) with the assistance of an outer force effect.

14. The method according to claim 1, in which the small quantity of liquid (1) on the at least one intermediate region (3,4) is stirred with the assistance of an outer force effect.

15. The method according to claim 1, in which the at least two quantities of liquid are applied on an intermediate region (3,4) and with the assistance of force effect, are moved relative to one another, preferably in order to mix them together or bring them to reaction.

16. A method for manipulation of small quantities of liquid on surfaces, in particular, chip surfaces, in which at least one small quantity of liquid (1) held together by its surface tension is applied onto an area of the surface with at least one intermediate region (3,4), which is disposed between two guide strips (5,6, 50) at least in a lateral spatial direction, whereby the small quantity of liquid (1) contacts at least one intermediate region (3,4) and at least one guide strip (5,6, 50), the at least one intermediate region (3,4) and the guide strips (5,6, 50) have different surface characteristics, which are selected such that a surface with the surface characteristic of a guide strip (5,6, 50) is wetted more strongly by the small amount of liquid (1) than a surface with the surface characteristic of the at least one intermediate region (3, 4), and for production of outer force, impulse from at least one surface sound wave is transmitted to the small quantity of liquid (1) in which the small quantity of liquid (1) on the at least one intermediate layer (3, 4) is moved along the guide strips (5, 6, 50).

17. The method according to claim 16, in which the at least one surface sound wave is produced with the assistance of at least one inter-digital transducer (7) with an emission direction (13) in the direction of at least one of the intermediate regions (3, 4).

18. A device for manipulation of at least one small quantity of liquid, comprising a chip surface, and at least one intermediate region (3,4) on the surface, which borders on and is located between at least two guide strips (5, 6, 50) in a lateral spatial direction, the guide strips (5, 6, 50) and the at least one intermediate region (3,4) having different surface characteristics, such that a surface of the guide strips (5, 6, 50) is more strongly wetted by the small quantity of liquid than a surface of the at least one intermediate region (3,4), and when the quantity of liquid (1) is placed upon the intermediate region (3,4) between the guide strips (5, 6, 50), the liquid quantity (1) disperses in the direction of the guide strips (5, 6, 50) and is held upon the intermediate region (3, 4) by surface tension of liquid within the quantity (1).

19. The device according to claim 18, in which the at least one intermediate region (3, 4) is raised relative to the guide strips (5, 6, 50), with a step between the at least one intermediate region (3,4) and adjacent guide strip being smaller than the height of the quantity of liquid (1) held together by surface tension on the intermediate region (3,4) and the guide strip (5).

20. The device according to claim 19, in which the guide strips (5, 6, 50) are flatly etched valleys in the surface.

21. The device according to claim 19, in which the raised intermediate region (3, 4) is formed by a coating or grown material.

22. The device according to claim 18, in which a surface of a surface outer region (31) adjacent a respective guide strip (5) on a side of the guide strip (5) facing away from the bordering intermediate region (3, 4), has different wetting characteristics from the surface of the intermediate region (3, 4), such that the small quantity of liquid wets stronger the surface of the intermediate region (3,4).

23. The device according to claim 18, in which the guide strips (5, 6, 50) in comparison to the at least one intermediate region (3,4) are hydrophilic.

24. The device according to claim 18, in which a lateral width (8) of the guide strips (5, 6, 50) is greater than a width of a precursor film of a quantity of liquid (1) to be manipulated.

25. The device according to claim 24, in which the lateral width (8) of the guide strips (5, 6, 50) is greater than 100 nm.

26. The device according to claim 18, wherein the intermediate region (3, 4) includes a field (4) limited in multiple spatial directions by the guide strips (5).

27. The device according to claim 18, wherein each said intermediate region (3) is surrounded on two, essentially opposite sides by the guide strips (5, 6, 50).

28. The device according to claim 18, wherein the guide strips (5, 6, 50) are arranged essentially in parallel.

29. The device according to claim 28, in which more than two guide strips (5, 6, 50) are arranged parallel side by side.

30. The device according to claim 18, with at least one intermediate region (3,4) which is functionalized at least partially physically, chemically, and/or biologically.

31. The device according to claim 30, in which the functionalized intermediate region is functionalized with biological macromolecules.

32. The device according to claim 18, comprising a network of intermediate regions (3) with defining guide strips (5) for transport and/or analysis of small quantities of liquid (1).

33. A device for manipulation of at least one small quantity of liquid, comprising a chip surface;

at least one intermediate region (3,4) on the surface, which is disposed between two guide strips (5, 6, 50) at least in one spatial direction, wherein the at least one guide strip (5, 6, 50) and intermediate region (3,4) have different surface characteristics, such that a surface of the guide strip (5, 6, 50) would be more strongly wetted by the small quantity of liquid than a surface of the at least one intermediate region (3, 4); and at least one surface wave generating device (7) with an emission direction (13) approximately along at least one of the intermediate regions (3, 4) for production of a surface sound wave.

34. The device according to claim 33, in which the at least one surface wave generating device includes an inter-digital transducer (7).

35. The device according to claim 34, in which the inter-digital transducer has a non-constant finger distance.

* * * * *